Figure 1:
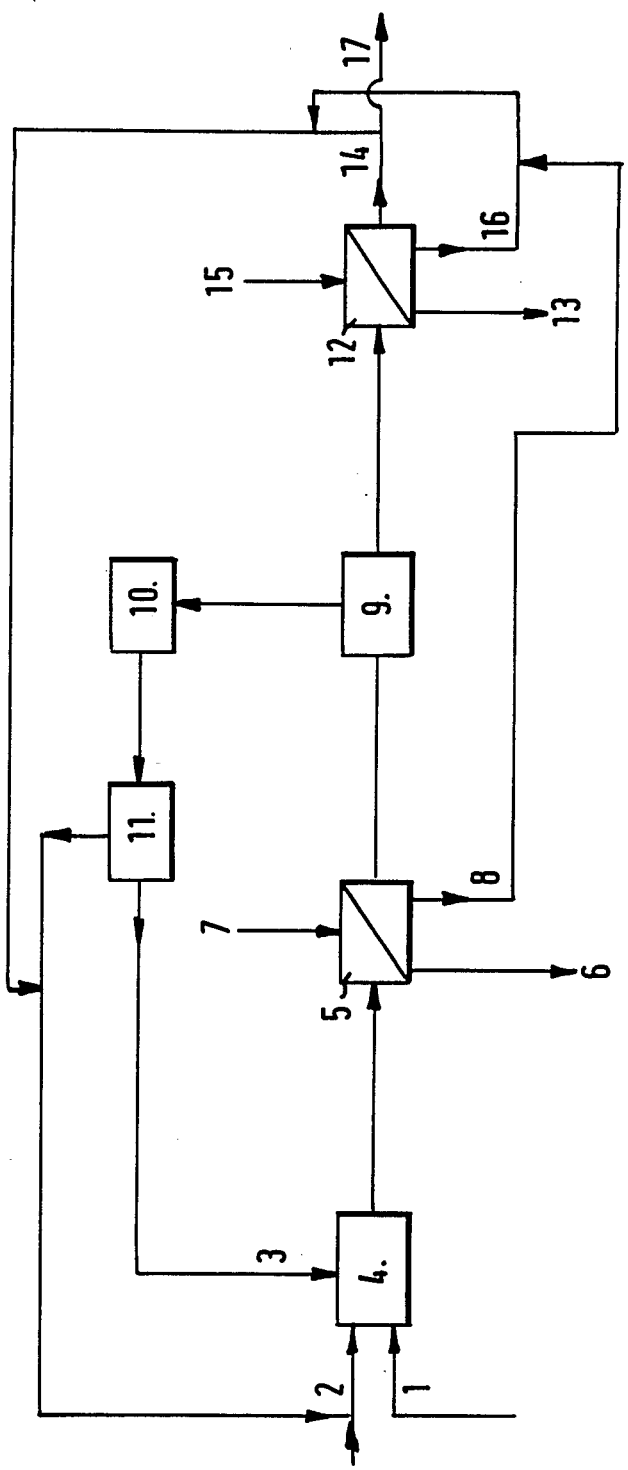

United States Patent [19]

Linnett et al.

[11] Patent Number: 4,677,198

[45] Date of Patent: Jun. 30, 1987

[54] PROCESS FOR THE PREPARATION OF OLIGOSACCHARIDES-CONTAINING PRODUCTS FROM BIOMASS

[75] Inventors: Paul E. Linnett, Kent, England; Johan P. M. Sanders, Delft, Netherlands

[73] Assignee: Gist-Brocades N.V., Delft, Netherlands

[21] Appl. No.: 671,666

[22] Filed: Nov. 15, 1984

[30] Foreign Application Priority Data

Nov. 22, 1983 [GB] United Kingdom ............... 8331108

[51] Int. Cl.$^4$ ........................... C07G 1/00; C07H 1/00
[52] U.S. Cl. .................................... 530/500; 536/1.1; 536/123
[58] Field of Search ................. 536/1.1, 123, 114; 530/500

[56] References Cited

U.S. PATENT DOCUMENTS

| | | | |
|---|---|---|---|
| 2,563,014 | 8/1951 | Durand | 536/1.1 |
| 3,511,910 | 5/1970 | Halleck | 536/1.1 |
| 3,766,165 | 10/1973 | Rennhard | 536/1.1 |
| 3,928,135 | 12/1975 | Milner | 536/1.1 |
| 4,021,543 | 5/1977 | McKay | 536/1.1 |
| 4,202,966 | 5/1980 | Misaki et al. | 536/1.1 |
| 4,233,438 | 11/1980 | Myers et al. | 536/123 |

FOREIGN PATENT DOCUMENTS

| | | | |
|---|---|---|---|
| 3042491 | 7/1982 | Fed. Rep. of Germany | 536/123 |
| 2513518 | 4/1983 | France | 536/123 |
| 0011302 | 1/1984 | Japan | 536/120 |

*Primary Examiner*—Dolph H. Torrence
*Attorney, Agent, or Firm*—Bierman & Muserlian

[57] ABSTRACT

Process for the preparation of oligosaccharides-containing products from biomass involving the use of hydrochloric acid for partly hydrolyzing biomass to easily fermentable oligosaccharides-containing products and easy recovery of the hydrochloric acid and the oligosaccharides containing products.

The oligosaccharides-containing products themselves and use of the latter for the preparation of useful products like ethanol and penicillin by fermentation.

11 Claims, 4 Drawing Figures

PROCESS FOR THE PREPARATION OF OLIGOSACCHARIDES-CONTAINING PRODUCTS FROM BIOMASS

The present invention relates to a process for the preparation of oligosaccharides-containing products from biomass and, further, relates to oligosaccharides-containing products and their use.

Comminuted biomass which comprises as main components cellulose, hemicellulose and lignin and which may be derived from comminuted trees (hard wood and soft wood), plants, grasses and waste materials, such as wood chips, sawdust, chopped straw and bagasse, corncops, rice hulls, municipal waste and the like has long been recognised as a source of useful carbohydrates such as cellulose and sugars. A great deal of research effort is currently being spent in this field of technology with the aim of producing sugars and liquid fuels like ethanol from biomass.

From European patent application No. 52896 a method is known for hydrolysing moist cellulosic mass into sugar monomers. This method involves the use of HCl gas, which is absorbed by the water of the moist cellulosic mass until a HCl concentration of 39% to 45% by weight is reached, to achieve a first hydrolysis of the cellulosic mass. The mass resulting from this first hydrolysis by highly concentrated HCl aqueous solution contains sugar monomers and oligomers and is subjected to a reduced pressure of 20-30 mm Hg in order to cause an evolution of gaseous HCl which is recycled in the process. This degassing is continued until the solution of HCl with which the hydrolysed mass is impregnated will reach the concentration of the water-HCl azeotrope, which corresponds with a HCl concentration of the HCl aqueous solution of 23-24% by weight under 20-30 mm Hg. After this first hydrolysis a second or post-hydrolysis is carried out in which the oligosaccharides present in the degassed mass resulting from the first hydrolysis step are converted into monomeric sugars.

The objective of the process is described in European patent application No. 52896 is to convert biomass as efficiently as possible into monomeric sugars. After the first hydrolysis an aqueous mixture of monomers and oligomers of sugar is obtained which after having been degassed results in a paste, which is then diluted with water until all the oligosaccharides have been dissolved. Then the resulting solution is heated preferably to boil to complete the hydrolysis of the oligosaccharides to monomeric sugars, while a loss of HCl is inevitable for economical reasons.

As a result of extensive experimentation, we have now found a process which is significantly cheaper due to avoiding the loss of HCl and due to energy savings in the HCl removal. In this process the biomass is contacted with an aqueous hydrochloric acid for a short time to dissolve the biomass, while this process does not involve complete hydrolysis of the biomass. According to this process, oligosaccharides-containing products can be obtained which appear to be surprisingly well fermentable into, and extremely useful for the fermentative production of a variety of useful products. For example the product appears to be convertible into glucose by cellulase (enzymes) at a surprisingly high rate as compared with the direct conversion of the biomass. Fermentation of the product into ethanol at high conversion rates appears to be possible. Further the use of the product directly for the microbial production of e.g. penicillin has proved to be feasible. In addition the use of the product directly for the production of enzymes (e.g. cellulase and amyloglucosidase) appears to be possible. Moreover the product may be used as substitution of or addition to cattle feed, advantageously non ruminant cattle such as pigs, in order to save costs. More advantageously the lignin containing product may be applied to provide structure to the feed.

Accordingly the present invention also provides such uses.

Thus the present invention provides a process for the preparation of oligosaccharides-containing products from comminuted biomass comprising (a) contacting the biomass with a highly concentrated aqueous hydrochloric acid solution until substantially all of the cellulose and hemicellulose have been dissolved, lignin and other materials insoluble in highly concentrated HCl can optionally be removed by centrifugation or filtration in this stage (b) the precipitation of the oligosaccharides containing product with concurrent reduction of the hydrochloric acid concentration by dilution and/or evaporation under reduced pressure and recycling of the gaseous hydrochloric acid and condensed hydrochloric acid to stage (a)

(c) separation of the precipitated oligosaccharides-containing product from the aqueous hydrochloric acid solution and recycling of the latter for use in stage (a).

The term highly concentrated will mean that the concentration of the aqueous hydrochloric acid solution is such that it can dissolve substantially all of the cellulose and hemicellulose of the biomass and the solution therefore suitably contains not less than 39% by weight of hydrochloric acid. It will be appreciated that a lower hydrochloric acid concentration ranging from 25-39% by weight can be filled up by the addition of one or more chlorides resulting in a total chloride concentration of not less than 10 mol/l.

Suitably the biomass is contacted with the aqueous hydrochloric acid solution at a temperature below 35° C. including temperatures below 0° C., and preferably at a temperature of 0°-25° C. When the biomass is completely wetted hydrogen chloride gas is suitably passed into the biomass aqueous hydrochloric acid mixture in order to increase the hydrochloric acid concentration to about 42% by weight. Higher concentrations up to about 45% by weight are possible when the temperature is lowered to about 0° C. or below 0° C. or if pressure is increased above 1 Ata. The reduction of the hydrochloric acid concentration is preferably carried out at a temperature of 20° to 40° C. by dilution or reduced pressure. According to a specific embodiment the reduction of hydrochloric acid concentration takes place under reduced pressure until the concentration of the water-hydrochloric acid azeotrope is reached and the gaseous hydrochloric acid and condensed azeotrope of hydrochloric acid is recycled to stage (a).

The precipitation is carried out at a temperature of −20° to 40° C. and more preferably of −10° to 10° C.

The biomass is preferably contacted with the highly concentrated hydrochloric acid solution for 5-45 minutes and preferably 15-40 minutes. Preferably the hydrochloric acid concentration of the aqueous solution is reduced to a concentration of 22-30% by weight at a reduced pressure of less than 35 mm Hg.

The savings on energy are significant compared with the process as described in European patent application 52896 due to the reduction of the hydrochloric acid concentration for instance to 25% by weight as calculated in Table 1.

TABLE 1

| Biomass to liquid ratio | Energy required for removal of HCl per kg sugars (MJ/kg) | | |
|---|---|---|---|
| | Fuming HCl, total hydrolysis (reduction to 1% HCl) | This process (reduction to 25% HCl) | European patent application 52896 |
| 1:4 | 12.60 | 1.52 | 11.6 |
| 1:3 | 9.48 | 1.14 | 8.7 |
| 1:2 | 6.32 | 0.78 | 5.8 |
| 1:1 | 3.16 | 0.38 | 2.9 |

The hydrogen chloride (and the hydrochloric acid azeotrope) recovered in the evaporation stage and the above supernatant, containing azeotropic hydrochloric acid, should be used to initiate the next digestion cycle. The only acid lost would be that adhering to the oligosaccharides-containing precipitate and lignin but this can be recovered satisfactorily by a judicious choice of a washing method. The gaseous hydrogen chloride and the aqueous hydrochloric acid being recycled to process-stage (a) may be passed into that process-stage via separate lines or via the same line which means that the gaseous and aqueous hydrochloric acid streams should be combined. The loss of HCl will be 0.14 ton HCl/ton ethanol formed in the fermentation process which is significant low compared with the process as described in European patent application 52896 in which the loss of HCl is 0.30–1.0 ton HCl/ton ethanol. Probably even more HCl is lost in the latter process due to tightly bound HCl to lignin, which is not accounted for.

It will be appreciated that the lignin from the biomass can be treated in two possible ways i.e. by collection together with the oligosaccharides-containing product after the hydrogen chloride evaporation stage and preferably a separate precipitation stage or by separating the insoluble materials (lignin) from the soluble oligosaccharides after the digestion step but before the evaporation and concurrent precipitation stage. In practice it is known that lignin can disturb the fermentation; so preferably the insoluble materials (lignin) are separated before the reduction of the hydrogen chloride concentration.

The present invention further provides the preferred oligosaccharides-containing products without lignin prepared by the process as hereinbefore defined. These products form a characteristic feature of the invention.

The product which is obtained by the present process appears to be of a specific composition dependent on the composition of the starting material. Thus the present invention further provides oligosaccharides-containing products with typical compositions when the lignin is retained (e.g. starting from poplar and cypress wood as examples for hard and soft wood) comprising 0–1.5% by weight of anhydroarabinose, 0.5–6% by weight of anhydromannose, 1–30% by weight of anhydroxylose, 25–60% by weight of anhydroglucose, 20–50% by weight of lignin and 1.5–2.5% by weight of ash and with typical compositions without lignin comprising 0–3% by weight of anhydroarabinose, 1–9% by weight of anhydromannose, 4–30% by weight of anhydroxylose and 70–95% by weight of anhydroglucose.

UV spectra characterize the oligosaccharides-containing products. In Table 2 a 0.5% oligosaccharides-containing product of poplar solution in a 70% $ZnCl_2$ solution is compared for the various wave lengths with a molasse solution with 0.5% sugar.

TABLE 2

| | Absorbance | |
|---|---|---|
| Wave length (nm) | Molasses (0.5% sugar) W/V | Oligosaccharides-containing products (0.5%) W/V |
| 300 | 2.0 | 0.75 |
| 350 | 2.4 | 0.95 |
| 400 | 2.95 | 0.75 |
| 500 | 1.49 | 0.45 |
| 600 | 0.8 | 0.3 |
| 700 | 0.7 | 0.2 |

The absorbance is proportional to the amount of impurities of the material (by experience), so it is clear from Table 2 that the oligosaccharides-containing products contain less impurities than the molasses, while the European patent application 52896 higher temperatures of the hydrochloric acid cause an increase of this pollution.

Other characteristics of the oligosaccharides-containing products are the mean chain length (10–100 for the product, the mean length of the starting celluloses being 80–1,000 glucose residues), the intrinsic viscosity 60–100 and more particularly 70–80 ml $g^{-1}$ (EWWN) for oligosaccharides-containing products derived from α-cellulose) and the solubility in a HCl solution (36, 73 and 117 $gl^{-1}$ at 0° C. for the oligosaccharides-containing products of a Whatman CC31 cellulose in 26, 28 and 30% HCl solution, respectively and 30 $gl^{-1}$ for the oligosaccharides-containing products in a 22% HCl solution at 20° C.). Determined chain lengths and intrinsic viscosities are given in Table 3.

TABLE 3

| Sample | DNS reducing end-group** determination | | Viscosity measurements in++ modified EWNN solution (ml $g^{-1}$) | |
|---|---|---|---|---|
| | Apparent DP as measured (number average) | Corrected DP+ (number average) | DP by standard equation+++ (viscosity average) | DP by*** calibrationcurve (weight average) |
| Standard pulp* CORDENIER J-LV | 114 | 660 | 813 | 640 |
| Whatman No. 1 filterpaper | 160 | 927 | 3924 | 2500 |
| Product from filterpaper | 9.4 | 54 | 72 | 76 |
| Sigma cellulose | 89 | 517 | | |
| Product from cellulose | 3.3 | 19 | | |
| Whatman CC31 cellulose | 14 | 80 | | |
| Product from | 5.6 | 32 | | |

TABLE 3-continued

| | DNS reducing end-group** determination | | Viscosity measurements in++ modified EWNN solution (ml g$^{-1}$) | |
|---|---|---|---|---|
| Sample | Apparent DP as measured (number average) | Corrected DP+ (number average) | DP by standard equation+++ (viscosity average) | DP by*** calibrationcurve (weight average) |
| CC31 cellulose | | | | |

*Sample from ITT-RAYONIER, U.S.A. with weight average DP = 660
**G. Pettersson, J. Porath in Methods in Enzymology (E. F. Neufeld and V. Ginsburg, eds.), Vol. 8, pp 603–607, Academic Press, New York (1966)
+Calculation assumes that the scale-up factor for the standard pulp is valid for the other samples. These numbers are therefore only estimates
++Draft International Standard ISO/DIS 5351/2
+++B. Philipp, H. Schleicher and W. Wagenknecht, Cellul. Chem. Technol., 12, 529–552 (1978)
***Calibration used 5 standard pulp samples from ITT-Rayonier with weight average DP's from 660 to 2480

The present product may serve as a starting product in biochemical reactions which are known to convert compounds of the nature of those present in the product or using a fermentation process using the product carbohydrate as main carbon source. Preferably the lignin free oligosaccharides-containing products form starting products for such conversions. More preferably the oligosaccharides-containing products are converted into ethanol using a suitable fermentation process.

Furthermore the initially obtained product may be separated according to known methods into its components if desired which then results in a further characteristic range of useful products.

The present invention will now be described with reference to FIG. 1 which shows a scheme for the process in which comminuted biomass is introduced via line 1 into digester 4. Hydrochloric acid solution is introduced via line 2 into digester 4. Hydrogen chloride gas is introduced via line 3 into digester 4. From digester 4 an aqueous stream comprising dissolved cellulose and hemicellulose and undissolved matter such as lignin is passed to a solid/liquid separator 5 in which undissolved lignin is separated from the aqueous solution. The latter is further passed to a stripper/precipitator 9 in which under reduced pressure, created by a pump 10, hydrogen chloride gas and hydrochloric acid azeotrope are recovered and recycled via lines 2 and 3, respectively, to the digester 4 after separation in the condenser 11. The suspension of precipitated oligosaccharides in a lower concentration of hydrochloric acid from the stripper/precipitator 9 is introduced into the solid/liquid separator 12 in which the oligosaccharides-containing products are separated to line 13 from the hydrochloric acid solution, the latter being recycled via line 14 to the digester 4. The sugars not precipitated are partly (70-95%) recycled with the hydrogen chloric acid solution via line 14. From the bleed stream (17) of 5-30% of the sugars not precipitated, HCl is recovered for the greater part while the still remaining HCl can be used for the post hydrolysis of a part of the oligosaccharides-containing products into monomeric sugars. Lines 7 and 15 are used for transport of wash water which may be introduced into solid/liquid separators 5 and 12 to wash the precipitates of lignin and oligosaccharides-containing products, respectively. Separated lignin is drained off by line 6. Through line 8 the used wash liquid is recycled.

Figure 2:
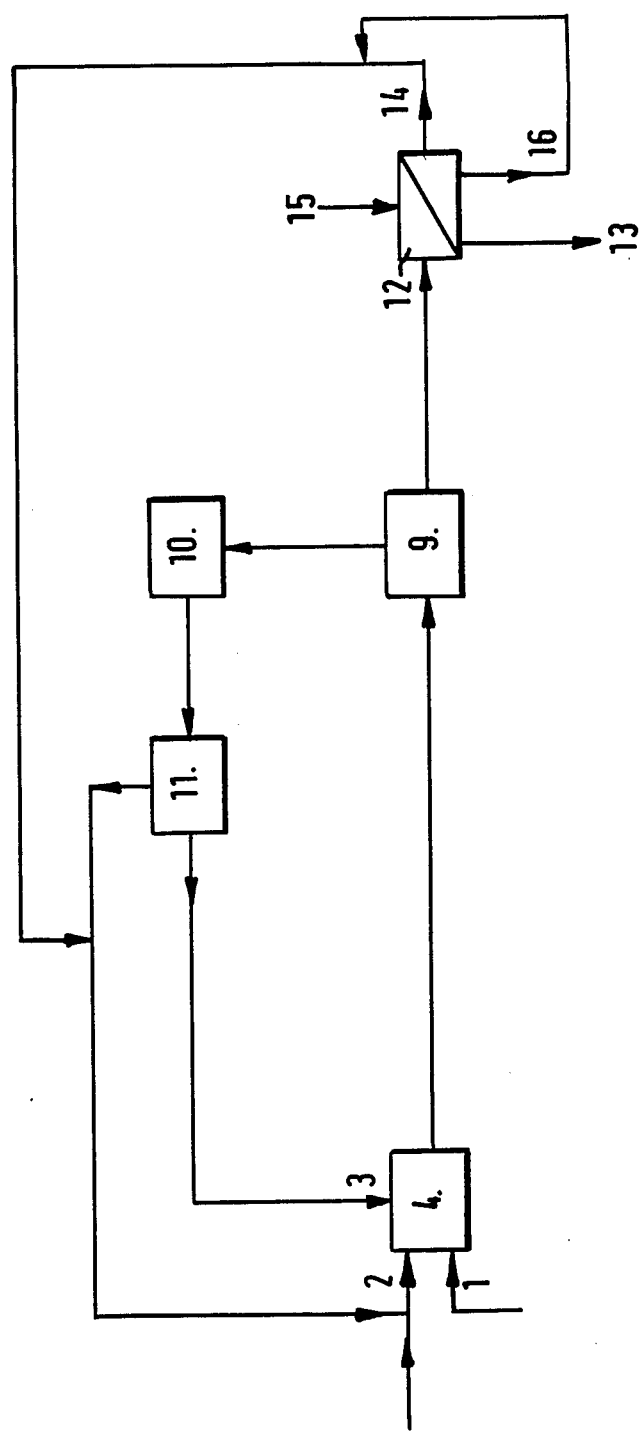

An alternative scheme for the process of the invention is shown in FIG. 2. The difference between this scheme and that in FIG. 1 is that there is no separation of lignin from dissolved cellulose and hemicellulose. Thus the aqueous stream from digester 4 is fed directly to the stripper/precipitator 9. The oligosaccharides-containing products in this case also contain lignin and are again separated in the solid/liquid separator 12 to give a washed solid stream at line 13 with the hydrochloric acid component being recycled via line 14 and washings via line 16.

Figure 3:
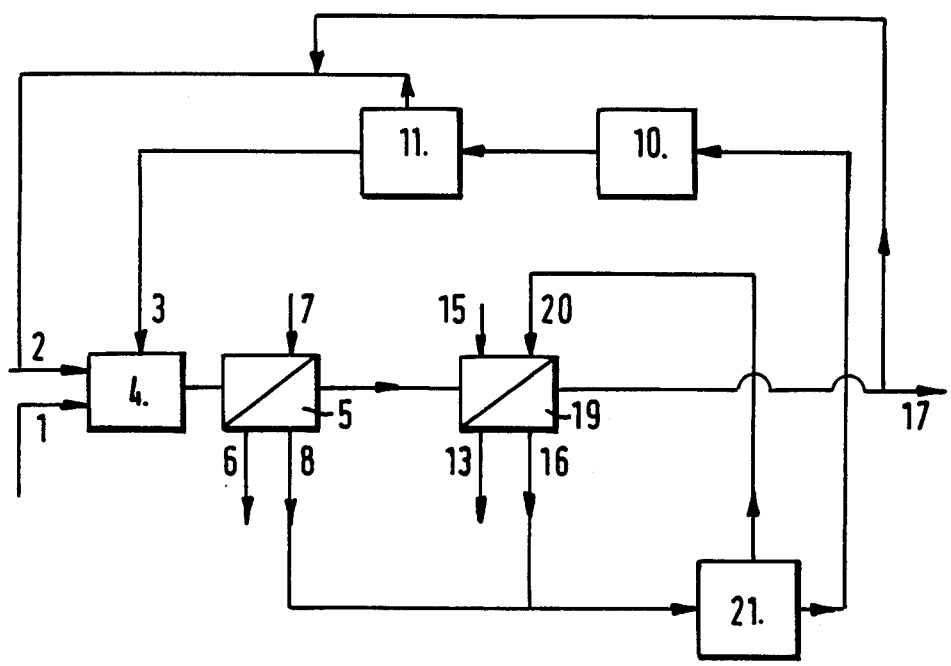

Another alternative scheme for the process of the invention is shown in FIG. 3. The difference between this scheme and that in FIG. 1 is that the hydrochloric acid concentration is not reduced by an evaporation step (as carried out in apparatus 9 in FIG. 1) but by dilution in a dilution vessel annex solid/liquid separator 19 by a stream of low concentrated hydrochloric acid from line 20. This low concentrated hydrochloric acid is obtained in a separate evaporation step in apparatus 21, which is fed by the liquid obtained from vessel 19 after precipitation of the oligosaccharides containing product.

The present invention will be further described with reference to the examples, without restricting the scope of the present invention to these examples.

Examples I-V represent illustrations of the process. In these Examples data are given of the yield of the oligosaccharides-containing product and on the relative initial rate with which cellulase converts the product into glucose. Examples VI and VII represent illustrations of use of the product obtained by the present process.

EXAMPLE I

α-Cellulose (from Sigma Chemical Co. Ltd.; 10 g), which is in powder form, was added to concentrated hydrochloric acid (100 ml) and the mixture was stirred magnetically and cooled in ice-water. When the cellulose had become completely wetted, hydrogen chloride gas was passed into the mixture until a clear viscous solution had been obtained. This usually took place in 25-45 minutes depending upon rate of stirring, rate of hydrogen chloride addition etc.. The reaction mixture was put under reduced pressure in a water bath at 20° C. After most of the excess hydrogen chloride gas had been removed, the solution was allowed to warm up to about 25° C. and evaporation was continued until precipitation took place.

The precipitate was then isolated by centrifugation and washed with water (40 ml). The washings were added to the supernatant from the centrifugation to give a total volume of 70 ml which was then made up to 100 ml by addition of concentrated hydrochloric acid. The precipitated oligosaccharides-containing product was washed on a sinter with ethanol and then ether and finally dried under vacuum over KOH and silica gel to give a white power (7.8 g).

The above supernatant and washings were used to digest a further 10 g of α-cellulose by the same procedure. In a like manner four cycles of digestion were carried out. The oligosaccharides-containing product samples from each cycle were weighed and compared in the following cellulase assay together with the starting material.

The cellulose sample (50 mg), 50 mg of Trichoderma cellulase (Maxazyme CL (R), Gist-Brocades NV) and 5 mg of Aspergillus cellulase (Sigma Chemical Co. Ltd.) were shaken in 5 ml final volume of sodium citrate/phosphate buffer (0.048M in citrate, 0.1M in phosphate), pH 5.0, containing 0.02% of sodium azide at 50° C. At time intervals samples were taken, centrifuged and the supernatants were analyzed for glucose content (Y.S.I model 23AM Glucose Analyser, Clandon Scientific).

The results from this series of experiments are shown in Table 4. The percentage yield of the oligosaccharides-containing product improved from 82 to 99% due to saturation of the starting α-cellulose by cycle 4. The initial rates of the cellulase assay for these oligosaccharides-containing product samples were 4–9-fold faster than for the starting α-cellulose. These rates are maintained till 80–90% conversion is reached while the rate of the α-cellulose levels off after only a minor part (20–30%) of the substrate has been converted.

TABLE 4

| Cycle | Yield of oligosaccharides-containing product (g) | % Yield on dry starting cellulose* | Relative initial rate in cellulase assay |
|---|---|---|---|
| 1 | 7.8 | 83 | 3.6 |
| 2 | 7.7 | 82 | 8.7 |
| 3 | 8.8 | 94 | 8.1 |
| 4 | 9.25 | 99 | 5.6 |
| α-cellulose | — | — | 1.0 |

*Based on 9.37 g dry weight of α-cellulose at start of each cycle.

It will be clear from Table 4 that the present process produces at very high yields oligosaccharides-containing product which appears to be convertable at a surprisingly high rate by cellulase to glucose.

EXAMPLE II

Poplar wood, as an example of a hardwood, knife-milled through a 2 mm screen (4.0 g; 3.8 g dry weight) was stirred with 40 ml of concentrated hydrochloric acid and cooled in ice-water. Hydrogen chloride gas was passed in at such a rate that the reaction temperature did not exceed 10° C. After saturation, stirring was continued for 30 minutes with continuing hydrogen chloride passage. The green-black slurry was then concentrated under reduced pressure with a bath temperature of 20° C. until the concentration of hydrochloric acid was reduced to about 27% by weight. Centrifugation gave a pellet of the oligosaccharides-containing product and lignin which was washed with water. The pellet was neutralised with sodium bicarbonate, washed with water and freeze-dried. The supernatant and primary washings were made up to a volume of 40 ml with concentrated hydrochloric acid and were stirred with 4.0 g of poplar wood to start the second cycle which was carried out as above. In this way 7 cycles of poplar wood digestion were carried out.

The results from this series of experiments are summarised in Table 5. It can be seen that the initial rates for the cellulase assay were 22- to 38-fold faster than for a sample of milled poplar wood. These rates are maintained till 80–90% conversion if reached while the rate of the milled poplar wood levels off after only a minor part (5%) of the substrate has been converted.

TABLE 5

| Cycle | Weight of precipitated* oligosaccharides-containing products + insoluble products (lignin) (g) | % Yield on dry starting wood | Relative initial rate in cellulase assay |
|---|---|---|---|
| 1 | 0.85 | 22 | 21.9 |
| 2 | 2.57 | 67 | 29.4 |
| 3 | 2.53 | 66 | 30.0 |
| 4 | 2.49 | 65 | 32.4 |
| 5 | 2.69 | 71 | 33.1 |
| 6 | 3.82 | 100 | 38.1 |
| 7 | 2.24 | 59 | 31.3 |
| milled poplar wood | — | — | 1.0 |

*Corrected for handling losses.

EXAMPLE III

Concentrated hydrochloric acid (40 ml) was saturated with hydrogen chloride gas at 20° C. and then 4.0 g of knife-milled poplar wood was added with overhead stirring. Hydrogen chloride gas was passed in for 20 minutes at 20° C. with stirring. The green-black slurry was then concentrated under reduced pressure with a bath temperature of 25° C. until the concentration of hydrochloric acid was reduced to 22–23% by weight. Centrifugation gave a pellet of the oligosaccharides-containing product and lignin, which was washed with 2×9 ml of water. The pellet was neutralised with sodium bicarbonate, washed with water and freeze-dried.

The supernatant and primary washings were made up to 40 ml with concentrated hydrochloric acid and saturated with hydrogen chloride gas at 20° C. with stirring to start a second cycle with 4.0 g of poplar wood digestion as for the first cycle. In this way 8 cycles of poplar wood digestion were carried out.

The results from this series of experiments are shown in Table 6. It can be seen that the initial rates for the cellulase assay were 26- to 34-fold faster than for a sample of milled poplar wood.

TABLE 6

| Cycle | Weight of precipitated* oligosaccharides-containing products + insoluble products (lignin) (g) | % Yield on dry starting wood | Relative initial rate in cellulase assay |
|---|---|---|---|
| 1 | 2.24 | 59 | 25.6 |
| 2 | 2.72 | 71 | 33.9 |
| 3 | 2.13 | 56 | 32.6 |
| 4 | 2.32 | 61 | 34.1 |
| 5 | 2.07 | 54 | 32.9 |
| 6 | 2.23 | 58 | 30.2 |
| 7 | 2.15 | 56 | 29.8 |
| 8 | 2.85 | 75 | 31.2 |
| milled poplar wood | — | — | 1.0 |

*Corrected for handling losses.

EXAMPLE IV

Concentrated hydrochloric acid (40 ml) was saturated with hydrogen chloride gas at 20° C. and then 8.0 g (7.3 g dry weight) of Lawson's cypress, as an example of a softwood knife-milled through a 2 mm screen was added with overhead stirring. Hydrogen chloride gas was passed in for 15 minutes at 20° C. with stirring. Evaporation of the acid and work-up of the product was carried out as in Example III to give 4.7 g of freeze-dried oligosaccharides-containing products and lignin (6.0 g after correction for handling losses; 81% yield on dry starting wood). In the cellulase assay the initial rate of hydrolysis was 41.0 for the product relative to 1.0 for the starting milled wood.

EXAMPLE V

Concentrated hydrochloric acid (40 ml) was saturated with hydrogen chloride gas at 0° C. and then 4.0 g (3.9 g dry weight) of sugarcane bagasse (as an example of an agricultural waste) hammer-milled through a 3 mm screen was added with overhead stirring. Hydrogen chloride gas was passed in for 30 minutes at 0° C. with stirring. Evaporation of the acid and recovery of the product was carried out as in Example III to give 2.2 g of the freeze-dried oligosaccharides-containing product and lignin (2.5 g after correction for handling losses; 65% yield on dry starting bagasse). In the cellulase assay the initial rate of hydrolysis was 15.0 for the product relative to 1.0 for the starting milled bagasse.

In Table 7 data are given on the analysis of products prepared by the present process.

TABLE 7

| Source of product | Percentage composition by weight* | | | | | |
|---|---|---|---|---|---|---|
| | Insoluble products (lignin) | Anhydro glucose | Anhydro xylose | Anhydro mannose | Anhydro arabinose | Ash |
| Example II | | | | | | |
| cycle 7 pooled | 40.4 | 48.1 | 3.0 | 1.8 | — | 2.0 |
| cycles 1–7 | 39.0 | 57.6 | 3.1 | — | — | — |
| Example III | | | | | | |
| cycle 8 pooled | 44.7 | 38.8 | 2.5 | 0.9 | — | 2.0 |
| cycles 1–8 | 40.1 | 45.5 | 2.0 | 0.9 | — | — |
| Example IV | 36.8 | 51.8 | 2.4 | 5.5 | 1.5 | ND+ |

*A weighed sample of the product (about 100 mg) was stirred with 10 ml of concentrated hydrochloric acid and HCl gas passed through at 0° C. for 1 hour and then for 2 hours more at 20° C. The residue was filtered off, washed and dried (lignin). The filtrate plus washings were evaporated to dryness. The residue was hydrolysed with 25 ml of 1 M sulphuric acid at 110° C. in a series of sealed tubes. After 0.75 and 3.0 hours multiple aliquots of 2 ml were cooled and neutralised with barium carbonate. Parts of the supernatants derivatised with 50 μl of Tri-Sil concentrate (Pierce) in 100 μl of dry pyridine. These samples were analysed by gas chromatography on a 50 m CP-Sil 8 capillary column (Chrompack) temperature-programmed from 140° C. to 270° C. at 10° C./minute to give the anhydro-sugar concentrations. Ash determinations were done by standard combustion methods. ND+ not determined.

EXAMPLE VI

Ethanol Production

Figure 4:
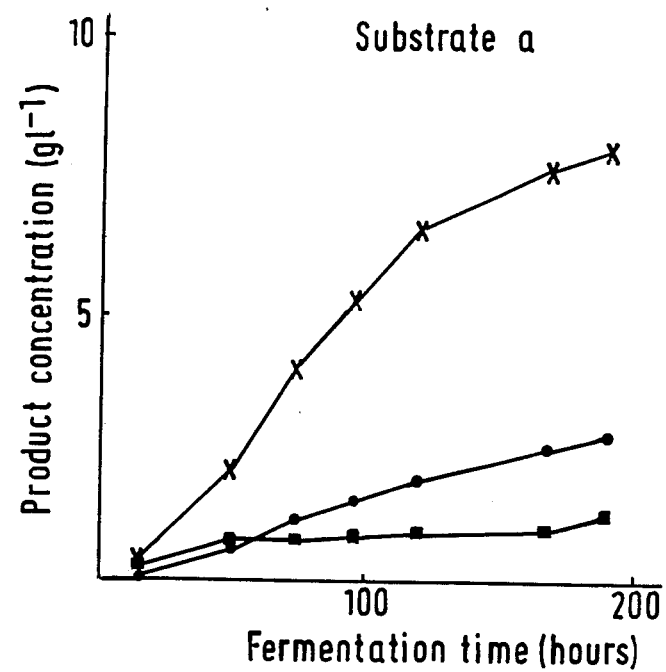
Figure 4:
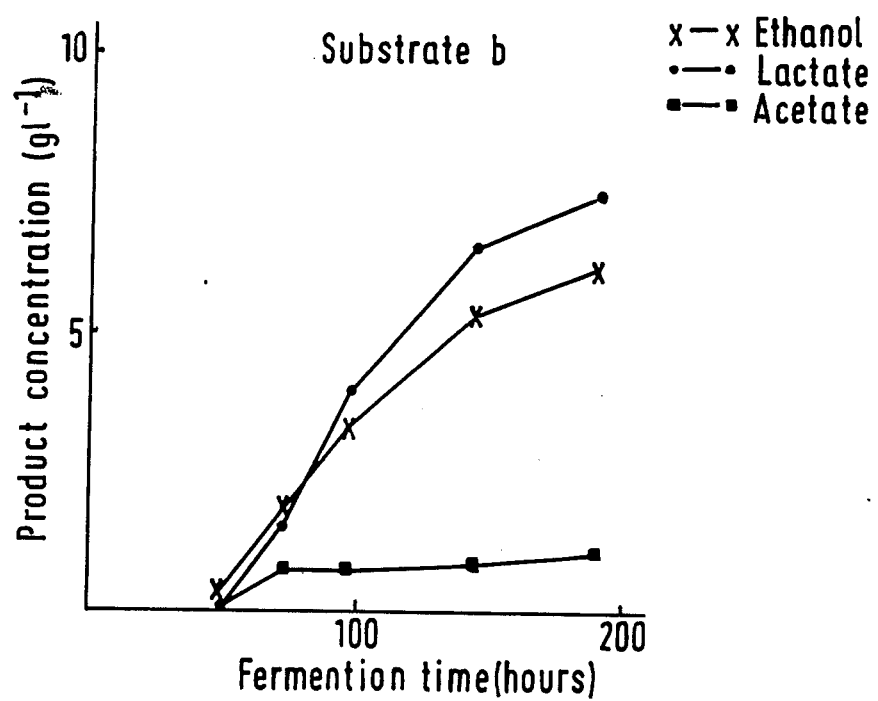

*Clostridium thermocellum* ATCC 31549 was cultured in 50 ml of the modified medium of Weimer & Zeikus* (Table 8). The initial pH was 7.5. All fermentations were carried out at 60° C. under an atmosphere of 95% $N_2$ and 5% $CO_2$. The incubation time was 190 hours. The pH was controlled during fermentation and maintained at 7.5 by the addition of $NaHCO_3$. The carbon sources used were a product obtained from poplar wood treated by the present process (substrate (a)) and a pure crystalline cellulose (trade name Avicel) (substrate (b)) at 3%. FIG. 4 shows the production of ethanol, acetate and lactate with time of incubation on substrate (a) and on substrate (b).

The rates of product formation are much the same in both cases. The product ratios are widely differing. In the 190th hour of the culture, the quantity of ethanol produced in case (b) was 7 gl$^{-1}$ with lactate (8 gl$^{-1}$) and acetate (1 gl$^{-1}$) also produced. In case (a) at the same time point, 8 gl$^{-1}$ ethanol, 3 gl$^{-1}$ lactate and 1 gl$^{-1}$ acetate were produced.

This example does not only show the usefulness of oligosaccharides-containing products as obtained by the process according to the present invention but also indicates that the ethanol production is surprisingly higher as compared with the ethanol production from pure cellulose.

TABLE 8

Medium of Weimer & Zeikus* - modified:

| | |
|---|---|
| Minimal salts solution | |
| Contains in 1,000 ml: | $(NH_4)_2SO_4$, 0.5 g |
| | K.phosphate buffer, 10 mmol |
| | $MgCl_2.6H_2O$, 0.2 g |
| | Yeast extract, 3 g |
| | Vitamins solution, 0.5 ml |
| | Minerals solution, 9.0 ml |
| | $Na_2S$ (2.5%), 20 ml |
| | Resazurin, 1.0 ml |
| | $NaHCO_3$, 50 mmol |
| Minerals solution | |
| Contains in 1,000 ml: | Nitrilotriacetic acid (pH 6.5 with KOH), 12.8 g |
| | $FeCl_3.4H_2O$, 0.2 g |
| | $MnCl_2.4H_2O$, 0.1 g |
| | $CoCl_2.6H_2O$, 0.17 g |
| | $CaCl_2.2H_2O$, 0.10 g |
| | $ZnCl_2$, 0.10 g |
| | $CuCl_2$, 0.02 g |
| | $H_3BO_3$, 0.01 g |
| | NaCl, 1.0 g |
| | $NaMoO_4.2H_2O$, 0.01 g |
| | $Na_2SeO_3$, 0.02 g |
| | $NiCl_2.6H_2O$, 0.1 g |
| Vitamins solution | |
| Contains in 1,000 ml: | Biotin, 40.0 mg |
| | p-aminobenzoic acid, 100 mg |
| | Folic acid, 40 mg |
| | Ca-pantothenate, 100 mg |
| | Nicotinic acid, 100 mg |
| | Vitamin $B_{12}$, 2 mg |
| | Thiamine-HCl, 10 mg |
| | Pyridoxine-HCl, 200 mg |
| | Thioctic acid, 100 mg |
| | Riboflavin, 10 mg |

*Medium of Weimer P. J. & Zeikus J. G., Appl. and Environm. Microbiol., 33, 289–297 (1977).

EXAMPLE VII

Penicillin V Production

A *Penicillium chrysogenum* strain, deposited with ATCC under No. 48271, was grown up from spores in a minimal salts medium* supplemented with the same product as in Example VI at a carbohydrate concentration of 70 gl$^{-1}$. The initial pH was 6.3. The culture was incubated shaking at 25° C. for 5 days.
* Similar to that described by Rhighelato R. C., Trinei A. P. J. and Pirt S. J., J. Gen. Microbiol. 50, 399–412 (1968).

Under these conditions, a concentration of penicillin V of 350 units ml$^{-1}$ was obtained.

EXAMPLE VIII

Poplar wood, as an example of hardwood, knife-milled through 2 mm screen (8.0 g; 7.5 g dry weight) was stirred with 90 ml of concentrated hydrochloric acid and cooled in ice-water. Hydrogen chloride gas was passed in at such a rate that the reaction temperature did not exceed 10° C. After saturation, stirring was continued for 40 minutes with continuing hydrogen chloride passage. The green-black slurry was then cooled to −10° C. and centrifuged. The supernatant was diluted with water to a concentration of hydrochloric acid of about 25% by weight, while temperature was −10° C. Centrifugation gave a pellet of the oligosaccharides-containing product which was washed with water. The pellet was neutralised with sodium bicarbonate, washed with water.

A *Penicillium chrysogenum* strain deposited with ATCC under no. 48271, was grown up from spores in a minimal salts medium as described in Example VII, supplemented with the product obtained in the preceeding process to a carbohydrate concentration of 70 g/l. The initial pH was 6.3. The culture was incubated shaking at 25° C. for 5 days. Under these conditions a concentration of penicillin V of 380 units $ml^{-1}$ was obtained.

We claim:

1. Process for the preparation of oligosaccharides-containing products from comminuted biomass comprising
   (a) contacting the biomass with a highly concentrated aqueous hydrochloric acid solution until substantially all of the cellulose and hemicellulose have been dissolved, lignin and other materials insoluble in highly concentrated HCl can optionally be removed by centrifugation or filtration at this stage
   (b) the precipitation of the oligosaccharides containing product with concurrent reduction of the hydrochloric acid concentration by dilution and/or evaporation under reduced pressure and recycling of the gaseous hydrochloric acid and condensed hydrochloric acid to stage (a).
   (c) separation of the precipitated oligosaccharides-containing product from the aqueous hydrochloric acid solution and recycling of the latter for use in stage (a).

2. Process according to claim 1, in which in stage (b) the reduction of the hydrochloric acid concentration takes place under reduced pressure until the concentration of water-hydrochloric acid azeotrope is reached and the gaseous hydrochloric acid and condensed azeotrope of hydrochloric acid is recycled to stage (a).

3. Process as claimed in claim 1 in which the biomass is contacted with the aqueous hydrochloric acid solution at a temperature of below 35° C. and preferably in the range of 0° to 25° C.

4. Process as claimed in claim 1 or 3 in which the reduction of the hydrochloric acid concentration is carried out at a temperature of 20° to 35° C.

5. Process as claimed in claim 1 in which the precipitation is carried out at a temperature of −20° to 35° C.

6. Process as claimed in claim 5 in which the precipitation is carried out at a temperature of −10° to 10° C.

7. Process as claimed in claim 1 in which the biomass is contacted with the aqueous hydrochloric acid solution for 5-45 minutes.

8. Process as claimed in claim 1 in which the hydrochloric acid concentration of the aqueous solution is reduced to a concentration of 22-30% by weight at a reduced pressure of less than 35 mm Hg.

9. Process according to claim 1 characterized in that soft wood is used as starting material in the process for the preparation of oligosaccharides-containing products.

10. Process according to claim 1 characterized in that the insoluble lignin is separated before the reduction of the hydrochloric acid concentration, with which the precipitation is carried out concurrently.

11. Process according to claim 1, characterized in that the lignin containing oligosaccharides containing product is prepared by separate precipitation by reduction of the hydrochloric acid concentration followed by an evaporation step and recycling of the gaseous hydrochloric acid.

* * * * *

UNITED STATES PATENT AND TRADEMARK OFFICE
CERTIFICATE OF CORRECTION

PATENT NO. : 4,677,198

DATED : June 30, 1987

INVENTOR(S) : PAUL E. LINNETT and JOHAN P.M. SANDERS

It is certified that error appears in the above-identified patent and that said Letters Patent is hereby corrected as shown below:

On the Title Page:

[73] Assignee: "Gist-Brocades N.V., Delft Netherlands" should be

--Gist-Brocades N.V. Delft, Netherlands and Shell International Research Maatschappij B.V. The Hague, Netherlands--

Signed and Sealed this

Twenty-sixth Day of January, 1988

Attest:

DONALD J. QUIGG

*Attesting Officer*  *Commissioner of Patents and Trademarks*